United States Patent [19]

Hickson et al.

[11] Patent Number: 4,611,694

[45] Date of Patent: Sep. 16, 1986

[54] MOUNTING PIN SEALS FOR DISC BRAKE CALIPERS

[75] Inventors: Russell L. Hickson, Rochester Hills; James L. Weber, West Bloomfield, both of Mich.

[73] Assignee: Rockwell International Corporation, Pittsburgh, Pa.

[21] Appl. No.: 698,287

[22] Filed: Feb. 4, 1985

[51] Int. Cl.4 .............................................. F16D 65/02
[52] U.S. Cl. ........................... 188/73.45; 277/212 FB
[58] Field of Search ............... 188/73.31, 73.44, 73.45, 188/264 G; 277/212 FB

[56] References Cited

U.S. PATENT DOCUMENTS 4,324,318 4/1982 Karasudani ...................... 188/73.31

FOREIGN PATENT DOCUMENTS 2437527 5/1980 France .............................. 188/73.45

Primary Examiner—Duane A. Reger

[57] ABSTRACT

A cylindrical seal for mounting pins for disc brake calipers has two parts. The first part is an elastomeric seal with a central accordian portion and radially extending end flanges. The second portion is a helical spring made of flat wire coiled in telescoping sliding convolutions which hold flanges on the inner element against radial surfaces and which protect the inner element from heat and debris.

13 Claims, 2 Drawing Figures

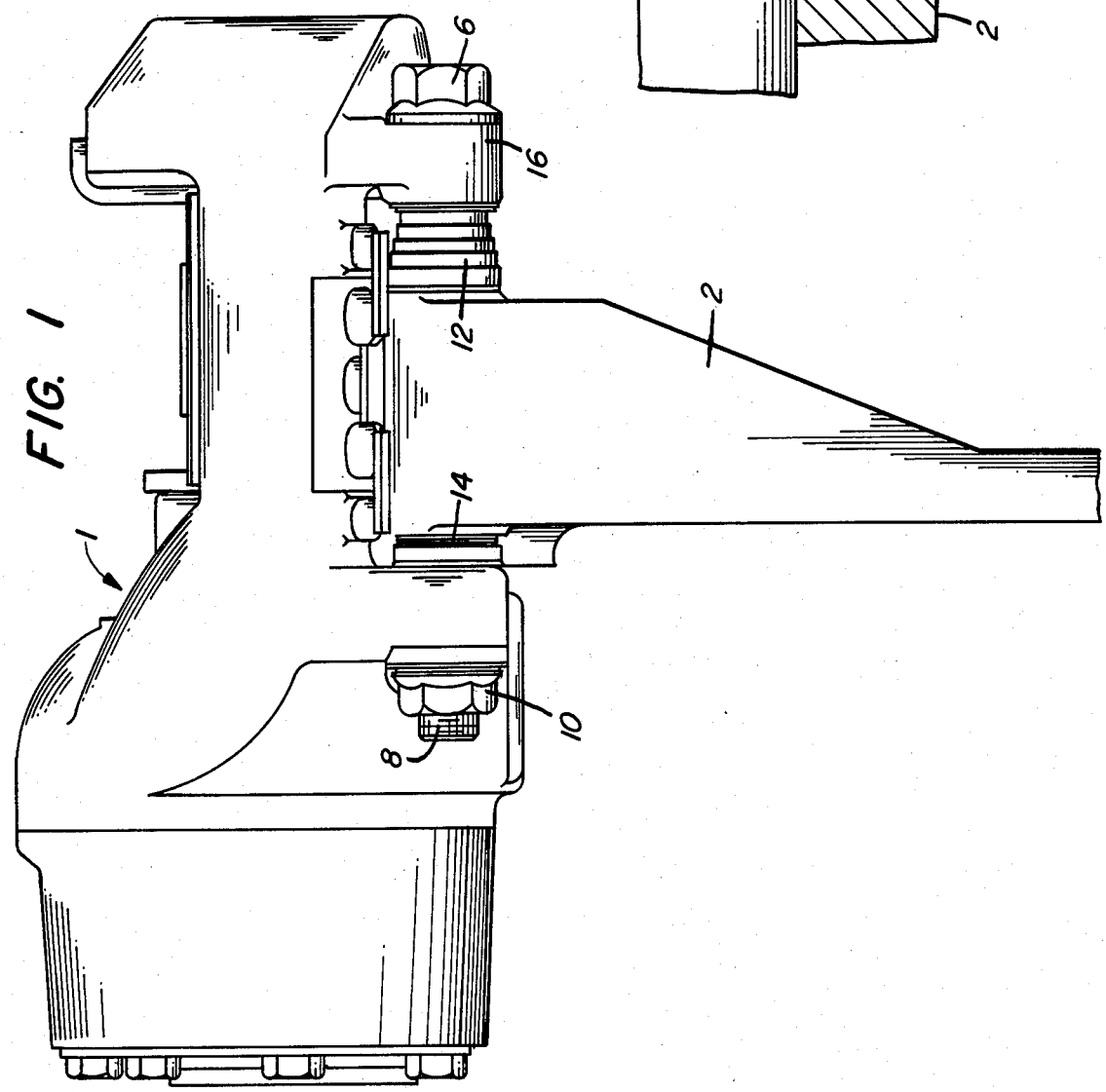

MOUNTING PIN SEALS FOR DISC BRAKE CALIPERS

BACKGROUND OF THE INVENTION

Disc brake caliper assemblies are mounted on pins which slide through openings in spiders which are attached to the axial housings. The pins must be sealed so that they freely slide, because the action of applying the brakes moves the entire calipers and the pins in the spiders. Although the movement is slight at any one application of the brakes, a range of movement must be provided so that the brakes remain function as the pads wear keeping the pins and their mountings free from dirt and debris is critical. Providing a large range in which the pins can operate is also critical. Problems continue to persist in the sealing of disc brake caliper mounting pins.

SUMMARY OF THE INVENTION

The present invention solves the problems of sealing caliper mounting pins by providing two seals. A first generally cylindrical inner seal has a flexible medial part which is accordian folded so that the seal remains flexible and integral through repeated uses and so that the seal is capable of extending from a compressed form to an elongated form on one side of the spider as the brake pads wear and so that the seal on the other side of the spider is capable of retaining its flexibility and integrity when changing from an elongated form to a shortened form on brake pad wear. The central portion of the seal is thin so that it may flex and shorten or elongate without rupturing.

The inner seal is provided with relatively thick radially extending end flanges which abut radial surfaces of the pin mounting elements, particularly the caliper and spider.

The invention also uniquely supplies a flat wire spring formed in a helix of sliding telescoping convolutions which has two functions. The outer flat wire spring pushes the radial flanges of the inner seal tightly against the radial surfaces to maintain the integrity of the seal and the flat wire sliding convolutions protect the inner seal from ingress of debris and heat which might damage the inner seal. The flat wire convolutions slide upon each other so that the outer seal may be changed form an extended form to a compressed form or from a compressed form to an extended as brake pads wear and convolutions of the flat wire spring are rounded outward so that round portions bear against the thick flanges of the inner seal to prevent cutting or wearing away of the flanges by the outer spring.

The above and further objects and features of the invention are apparent in the disclosure which includes the specification which is the above and ongoing description and the claims and the drawings.

BRIEF DESCRIPTION OF THE DRAWINGS

FIG. 1 is a side elevation of a disc brake calendar mounted on sealed pins which extend through a spider.

FIG. 2 is a detail of the inner and outer sealing elements.

DETAILED DESCRIPTION OF THE PREFERRED EMBODIMENT

Referring to FIG. 1, a disc brake caliper generally indicated by the numeral 1 is mounted on spiders 2 by sealing pins 4. Usually two sealing pins, one on either side, mount a caliper on a spider. As shown in FIG. 1, the sealing pin 4 is configured with a hex head 6. The opposite end 8 of the sealing pin is threaded to receive a nut 10. As the brakes are applied, the caliper 1 shifts slightly with respect to the spider 2, sliding along sealing pins 4.

As brake pads wear, the caliper shifts position on the spider 2 toward the actuator section or toward the left as indicated in FIG. 1. Two sets of seals 12 and 14 cover and protect the mounting pins 4 where the pins extend between the caliper and the spider. In an initial condition, the seal 12 is extended while the seal 14 is compressed. As the pads wear, seal 12 will be more compressed and seal 14 will be more extended.

Seal 12 is shown in FIG. 2. In the extended position shown, the pads are new. As the pads wear, the mounting lug 16 on caliper 1 will move toward the spider 2, as shown in phantom lines.

A suitable seal must provide for that movement while attaining its effectiveness.

The present seal as shown in FIG. 2 solves the problems of the shaft sealing. The first inner seal 20 has a flexible central or medial portion 22 which is a relatively thin accordian section so that the seal may be extended longitudinally or compressed axially. Radial flanges 24 and 26 extend radially outward from opposite ends of the central portion 22 to lie tightly against radial surfaces of the lug 16 of caliper 1 and of spider 2. The end flanges 24 and 26 are relatively thick as compared to the accordian folded central portion 22.

The second outer seal member 30 is a flat wire spring formed in a helical shape with sliding telescoping convolutions 32. Inner surfaces of one convolution slide against outer surfaces of the next adjacent inner convolution to form a tight seal and to prevent ingress of dirt or objects or heat toward the more vulnerable inner seal portion 20. Outer edges 34 and 36 of the outer seal are rounded so that they may tightly compress flanges 24 and 26 of the inner seal against the flat surfaces without damaging the relatively soft flanges.

As the brake pads wear and lug 16 moves towards spider 2, spring 12 compresses into the form shown generally by the phantom lines 12'.

In contrast, as the pads wear, seal 14 shown in FIG. 1 expands and automatically enlarges the accordian folded inner seal.

The present invention solves the problem of maintaining the integrity of the seal and protecting an elastomeric inner seal while pressing flanges of the inner seal tightly against radial surfaces with significant long term change in the relative positions.

Any suitable elastomeric material may be used for the inner seal, such as rubber, synthetic rubber or any suitable polymeric material. Any suitable spring material may be used for the outer element. Stainless steel or other material which does not corrode and which maintains its temper and relative slideability over long periods of use in damp and dirty environments is preferred.

While the invention has been described with reference to a specific embodiment, modifications and variations of the invention may be constructed without departing from the scope of the invention which is defined in the following claims.

What we claim is:

1. Disc brake caliper apparatus having mounting pins connected to a spider and extending in an axial direction for mounting the brake elements, the mounting pins having seals in which the improvement comprises a first inner seal adjacent the mounting pin and a second outer seal surrounding the inner seal, the outer seal comprising a flat helical spring having convolutions with flat outer and inner surfaces, a portion of the outer surface adjacent one edge of each convolution contacting a portion of the inner surface adjacent the opposite edge of each next outward convolution whereby as the brake apparatus slides on the mounting pin the convolutions slide in contact with the next adjacent convolutions to prevent ingress of foreign materials.

2. The apparatus of claim 1 wherein the inner seal comprises an elastomeric boot and wherein the outer seal protects the boot.

3. The apparatus of claim 1 wherein the inner seal comprises an accordian folded rubber boot.

4. The apparatus of claim 3 wherein the second outer seal comprises a metal helical spring for reducing heat flow toward the inner seal.

5. The apparatus of claim 1 wherein the inner seal is formed from a relatively flexible elastomeric material and comprises a generally axially extending medial portion and first and second radially outwardly extending flanges and wherein the second seal comprises a spring with terminal convolutions which bear against the radially outwardly extending flanges of the inner seal and urge the radially outwardly extending flanges of the inner seal axially outward in engagement with radially extending faces of adjacent devices.

6. The apparatus of claim 5 wherein the medial portion of the inner seal is relatively thin and wherein the radially outwardly extending flanges of the inner seal are relatively thick.

7. Seal apparatus for a mounting pin which connects a mounting member to a mounted member comprising,
 a flexible elastomeric seal having a medial portion and a radially extending flange at each end of said medial portion for abutting radial surfaces of the mounting member and mounted member and a flat wire compression spring parallel to the medial portion and contacting each said flange for urging said flanges against said radial surfaces of the mounting member and mounted member.

8. The apparatus of claim 7 wherein said flat wire compression spring has relatively sliding convolutions.

9. The apparatus of claim 8 wherein the sliding convolutions prevent accidental physical damage and heat damage to the elastomeric seal.

10. The apparatus of claim 9 wherein the medial portion of the elastomeric material is relatively thin and flexible and wherein said flange of the elastomeric material are relatively thick and less flexible.

11. The apparatus of claim 10 wherein the medial portion is accordian pleated.

12. The apparatus of claim 11 wherein the elastomeric material forms an inner seal and wherein the flat wire spring means forms an outer protective member.

13. Sealing apparatus for slide pins mounting disc brake calipers on spiders in which opposite ends of the mounting pins are mounted in aligned lugs on the caliper and the mounting pins extend through openings in the spiders and in which the seal means surround the slide pins between the spiders and the caliper lugs, the sealing apparatus comprising an inner elastomeric seal having an axially elongated generally cylindrical medial portion surrounding each pin and radially extending flanges for abutting radial faces of the spider and the lugs around the axially aligned pin receiving holes therein and a flat wire comprising spring means mounted between the radially extending flanges for urging the radially extending flanges against the radial faces of the spider and lugs and for protecting the elastomeric seal against accidental damage and rotor heat.

* * * * *